UNITED STATES PATENT OFFICE.

ROBERT RAFN, OF PORSGRUND, NORWAY, ASSIGNOR TO GENERAL ELECTRIC COMPANY, OF SCHENECTADY, NEW YORK, A CORPORATION.

PROCESS FOR PRODUCING TUNGSTEN POWDER.

1,130,197.

Specification of Letters Patent. Patented Mar. 2, 1915.

No Drawing. Application filed September 20, 1912. Serial No. 721,443.

*To all whom it may concern:*

Be it known that I, ROBERT RAFN, subject of the King of Norway, and residing at Porsgrund, Norway, have invented certain new and useful Improvements in Processes for Producing Tungsten Powder, of which the following is a specification.

It is known that when tungsten-trioxid is reduced by means of hydrogen as a rule a crystalline metal results. It is only by taking special precautionary measures that an amorphous tungsten, suitable for making filaments can be obtained by this method. In order to obtain a homogenous product, extraordinary skill in carrying out the process is required and close observation of a large number of details.

Exhaustive experiments have shown that an excellent initial material, suitable for making up into tungsten filaments, can be obtained by reducing the tungsten-trioxid to metal in two stages. First ammonia gas is passed over the tri-oxid, with the furnace at a dull red heat. By this means the so-called blue tungsten-oxid is obtained. Then the temperature is raised rapidly to cherry red and simultaneously hydrogen is introduced into the furnace in place of the ammonia gas. The resulting product is a tungsten powder of remarkable fineness.

Exactly what takes place when this process as described is carried out has not been actually determined. The peculiar behavior can be perhaps explained by the formation of an intermediate product containing hydrogen or nitrogen. It is, however, also possible that when the process is carried out in the manner described the appearance of a lower oxid is prevented, which generally has a crystalline form.

What I claim is:

1. A process for producing metallic tungsten powder which is suitable for making filaments, consisting of heating tungsten-trioxid at a dull red heat in ammonia gas to produce blue tungsten-oxid and then heating said blue oxid in an atmosphere of hydrogen at a higher temperature.

2. A process for producing metallic tungsten powder, consisting of reducing tungsten-trioxid to blue tungsten-oxid by heating it in ammonia gas, then substituting an atmosphere of hydrogen for the ammonia gas and rapidly raising the temperature of the blue oxid to reduce it to metal.

3. A process for producing fine metallic tungsten powder, consisting of reducing tungsten tri-oxid in the first stage to blue oxid by one reagent, then in the second stage at a certain temperature and completely reducing the blue oxid to metal by another reagent at a higher temperature.

In testimony whereof I affix my signature in presence of two witnesses.

ROBERT RAFN.

Witnesses:
 OSCAR BOCK,
 RALPH W. DOX.